US008947375B2

(12) United States Patent
Miyazaki et al.

(10) Patent No.: US 8,947,375 B2
(45) Date of Patent: Feb. 3, 2015

(54) INFORMATION PROCESSING DEVICE, INFORMATION PROCESSING METHOD, AND INFORMATION PROCESSING PROGRAM

(75) Inventors: Reiko Miyazaki, Tokyo (JP); Akihiro Komori, Tokyo (JP); Ritsuko Kano, Tokyo (JP); Yoshihito Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 489 days.

(21) Appl. No.: 13/220,677

(22) Filed: Aug. 29, 2011

(65) Prior Publication Data

US 2012/0056832 A1   Mar. 8, 2012

(30) Foreign Application Priority Data

Sep. 6, 2010   (JP) ................................ P2010-199347

(51) Int. Cl.
*G06F 3/041* (2006.01)
*G06F 3/0488* (2013.01)

(52) U.S. Cl.
CPC ........ *G06F 3/04883* (2013.01); *G06F 3/04886* (2013.01); *G06F 2203/04808* (2013.01)
USPC .......................................................... 345/173

(58) Field of Classification Search
CPC ....... G06F 3/041; G06F 3/0412; G06F 3/048; G06F 3/0488; G06F 3/04883; G06F 3/04886; G06F 2203/04808
USPC ................................................ 345/173–174
See application file for complete search history.

(56) References Cited

U.S. PATENT DOCUMENTS

| | | | |
|---|---|---|---|
| 4,725,694 A * | 2/1988 | Auer et al. ..................... 345/173 |
| 7,979,092 B2* | 7/2011 | Shin et al. ..................... 345/173 |
| 8,015,498 B2* | 9/2011 | Shigenobu .................... 715/765 |
| 8,294,724 B2* | 10/2012 | Suzuki ............................ 345/173 |
| 2008/0316186 A1* | 12/2008 | O'Brien .......................... 345/173 |
| 2009/0189868 A1* | 7/2009 | Joo et al. ........................ 345/173 |
| 2009/0251423 A1* | 10/2009 | Jung .............................. 345/173 |
| 2009/0287824 A1* | 11/2009 | Fisher et al. ................... 709/226 |
| 2009/0313567 A1* | 12/2009 | Kwon et al. .................... 345/173 |
| 2010/0261505 A1* | 10/2010 | Yeh et al. ....................... 715/863 |
| 2010/0333017 A1* | 12/2010 | Ortiz .............................. 715/800 |
| 2011/0001694 A1* | 1/2011 | Homma et al. ............... 345/156 |
| 2011/0047503 A1* | 2/2011 | Allen et al. .................... 715/784 |
| 2011/0175842 A1* | 7/2011 | Miura ............................ 345/173 |

(Continued)

FOREIGN PATENT DOCUMENTS

JP   2009-205675   9/2009

*Primary Examiner* — Dwayne Bost
*Assistant Examiner* — Ivelisse Martinez Quiles
(74) *Attorney, Agent, or Firm* — Finnegan, Henderson, Farabow, Garrett & Dunner, L.L.P.

(57) ABSTRACT

An information processing device including an operation unit in which an operation input is possible by a touch operation on an operating surface; and a control unit that executes processing corresponding to an operation input performed via the operation unit, wherein the control unit causes, if an area of a portion that is in contact with the operating surface accompanying a touch operation is obtained and a touch operation in which the area is equal to or greater than a predetermined value is performed, restoration information for later restoring the display contents of a screen that are currently being displayed on a display unit to be stored in a memory unit, and display contents of a screen are restored, according to an operation input performed via the operation unit, based on the restoration information recorded in the memory unit.

9 Claims, 8 Drawing Sheets

(56) References Cited

U.S. PATENT DOCUMENTS

2011/0239142 A1* 9/2011 Steeves et al. ............... 715/764
2011/0265004 A1* 10/2011 Sitko ............................ 715/730
2012/0079429 A1* 3/2012 Stathacopoulos et al. .... 715/830

* cited by examiner

INFORMATION PROCESSING DEVICE, INFORMATION PROCESSING METHOD, AND INFORMATION PROCESSING PROGRAM

BACKGROUND

The present disclosure relates to an information processing device, an information processing method, and an information processing program, and in particular, is preferably applied to, for example, an information processing device with a touch panel.

Recently, information processing devices including a variety of operation devices have been becoming prevalent. For example, with a mobile terminal including a touch panel, intuitive operations are possible by touch operations (touch, tap, drag, flick, and the like) performed on a screen (for example, refer to Japanese Unexamined Patent Application Publication No. 2009-205675).

SUMMARY

However, many mobile terminals have small screens and are not able to display much information at once. Such mobile terminals therefore allow a user to selectively view desired information by switching the information displayed on the screen.

In such a case when the information displayed on the screen is switched, there may occur a situation in which the user later attempts to recheck the display contents that are currently on the screen.

Therefore, if it is possible to store the display contents that are currently on the screen by a simple operation and to restore the display contents later, it is considered that the usability of such mobile terminals is able to be improved considerably.

It is desirable to provide an information processing device in which usability is considerably improved compared to the related art, an information processing method, and an information processing program.

According to an embodiment of the disclosure, an operation unit in which an operation input is possible by a touch operation on the operating surface and a control unit that executes processing corresponding to an operation input performed via the operation unit are provided, wherein the control unit causes, if an area of a portion that is in contact with the operating surface accompanying a touch operation is obtained and a touch operation in which the area is equal to or greater than a predetermined value is performed, restoration information for later restoring the display contents of a screen that are currently being displayed on a display unit to be stored in a memory unit, and display contents of a screen are restored, according to an operation input performed via the operation unit, based on the restoration information recorded in the memory unit.

According to the embodiment of the disclosure, restoration information for restoring the screen that is currently being displayed is stored in the memory unit according to a touch operation (for example, an operation of bringing the entire length of a finger into contact and sliding) in which the area of a portion that is in contact with the operating surface is equal to or greater than a predetermined value. In so doing, it is possible to store and later restore the display contents of the current screen by a simple operation. It is thus possible to realize an information processing device in which usability is considerably improved compared to the related art, an information processing method, and an information processing program.

DETAILED DESCRIPTION OF EMBODIMENTS

The most preferable forms (hereinafter, embodiments) of an embodiment of the disclosure will be described below. Here, description will be given in the following order.
1. Embodiment
2. Other Embodiments
1. Embodiment
1-1. Outline of Embodiment First, an outline of an embodiment will be described. Incidentally, after the description of the outline, a specific example of the embodiment will be described.

Figure 1:
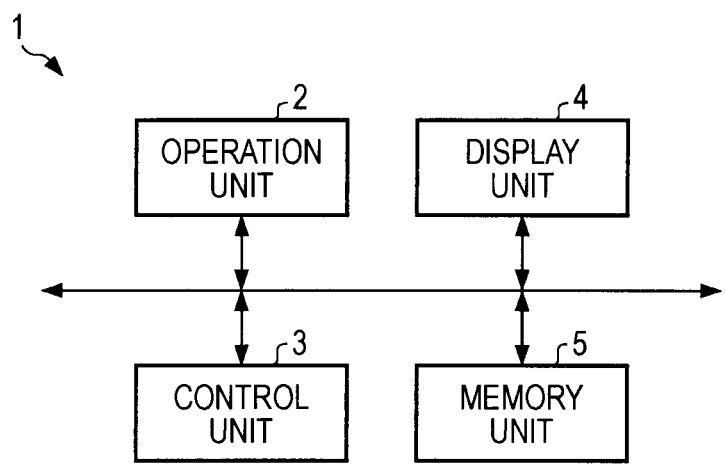
FIG. 1 is a block diagram illustrating a function configuration of an information processing device that is an outline of an embodiment.

1 in FIG. 1 indicates an information processing device. An operation unit 2 in which an operation input is possible by a touch operation on an operation surface is provided to the information processing device 1. Further, a control unit 3 that executes processing according to an operation input performed via the operation unit 2 is provided to the information processing device 1.

In the information processing device 1, the control unit 3 obtains the area of a portion that is in contact with the operating surface through a touch operation. The control unit 3 further causes, when a touch operation in which the area is equal to or greater than a predetermined value is performed, restoration information for later restoring the display contents of a screen that are currently being displayed on a display unit 4 to be stored in a memory unit 5.

Thereafter, the control unit 3 restores, according to an operation input performed via the operation unit 2, the display contents of the screen based on the restoration information stored in the memory unit 5.

In such a manner, in the information processing unit 1, the restoration information for restoring the screen that is currently being displayed is stored, according to a touch operation (for example, an operation of bringing the entire length of a finger into contact and sliding) in which the area of a portion that is in contact with the operating surface is equal to or greater than a predetermined value, in the memory unit 5. In so doing, the display contents of the current screen are able to be saved and restored later by a simple operation.

Specifically, the control unit 3 causes, when a drag equal to or greater than a predetermined length in a predetermined direction is performed in a state in which the area of a portion that is in contact is equal to or greater than a predetermined value, the restoration information for restoring the display contents of the screen that are currently being displayed on the display unit 4 to be stored in the memory unit 5.

Further, at this time, the control unit 3 obtains information for restoring the display contents of the screen that are currently being displayed on the display unit 4 in a state in which the same operation as the current operation is possible, and causes the information to be stored in the memory unit 5 as restoration information.

Furthermore, at this time, the control unit 3 may cause a screen capture image obtained by capturing a screen that is currently being displayed on the display unit 4 to be stored in the memory unit 5 as restoration information.

Here, it is supposed that the screen is a document display screen. In such a case, the control unit 3 obtains at least identification information of the document that is currently being displayed and display range information that indicates the range, out of the document, that is currently being displayed as information for restoring the display contents of the current document display screen in a state in which the same operation as the current operation is possible, to store as restoration information.

In addition, it is supposed that the screen is a movie reproduction screen or a music reproduction screen. In such a case, the control unit 3 obtains at least identification information of the movie or identification information of the music that is currently being reproduced and reproduction position information of the movie or reproduction position information of the sounds that are currently being reproduced as information for restoring the display contents of the movie reproduction screen or the music reproduction screen in a state in which the same operation as the current operation is possible, to store as restoration information.

Further, it is supposed that the screen is a still image display screen. In such a case, the control unit 3 obtains at least identification information of the still image that is currently being displayed and zoom information of the still image as information for restoring the display contents of the current still image display screen in a state in which the same operation as the current operation is possible, to store as restoration information.

Furthermore, it is supposed that the screen is a web browser screen. In such a case, the control unit 3 obtains at least the address of the webpage that is currently being displayed and display range information that indicates the range, out of the webpage, that is currently being displayed as information for restoring the display contents of the current web browser screen in a state in which the same operation as the current operation is possible, to store as restoration information.

Further, the control unit 3 determines, when there is one portion that is in contact with the operating surface and an area of the portion that is in contact is equal to or greater than an area that is equivalent to one finger and less than an area that is equivalent to two fingers, that a touch operation with one finger has been performed. On the other hand, the control unit 3 determines, when there are two portions that are in contact with the operating surface and an area of each portion that is in contact is equal to or greater than an area that is equivalent to one finger, or there is one portion that is in contact with the operation surface and an area of the portion that is in contact is equal to or greater than an area that is equivalent to two fingers, that a touch operation with two fingers has been performed.

Here, in a case when it is determined that a touch operation with one finger has been performed, the control unit 3 causes only a screen capture image obtained by capturing a screen that is currently being displayed to be stored as the restoration information in the memory unit 5. On the other hand, in a case when it is determined that a touch operation with two fingers has been performed, the control unit 3 causes information for restoring display contents of a screen that are currently being displayed in a state in which the same operation as the current operation is possible to be stored along with the screen capture image as the restoration information in the memory unit 5.

Further, if a touch operation in which the area is equal to or greater than a predetermined value is performed, the control unit 3 may cause a screen capture image obtained by capturing the current screen to be displayed on the screen. In such a case, the control unit 3 pastes, once a predetermined amount of time has passed, a thumbnail capture image obtained by making a thumbnail of the screen capture image to a tray that is displayed on the screen. Thereafter, the control unit 3 pastes, according to an operation input performed via the operation unit 2, a capture icon obtained by making an icon of the thumbnail capture image to a predetermined screen, and stores the restoration information in the memory unit 5 by making the restoration information correspond with the capture icon.

Further thereafter, when a capture icon is selected by an operation input performed via the operation unit 2, the control unit 3 reads the restoration information made to correspond with the capture icon from the memory unit 5 and restores the display contents of the screen based on the restoration information.

A specific example of the information processing device 1 configured in such a manner will be described below in more detail.

Figure 2:
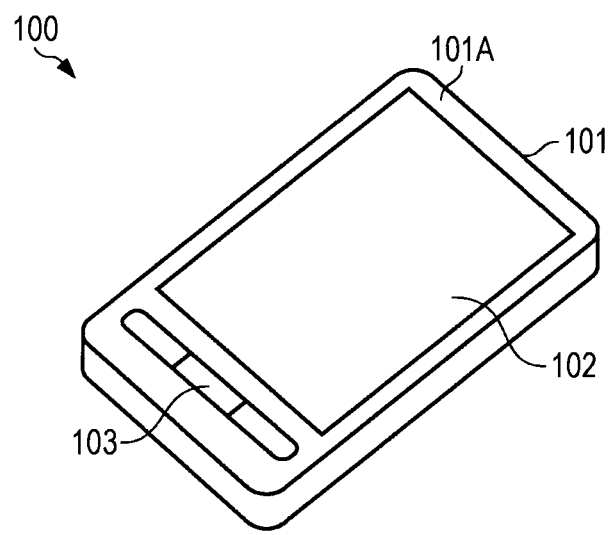
FIG. 2 is a substantially diagrammatical view illustrating an appearance configuration of a mobile terminal.

1-2. Specific Example of Embodiment 1-2-1. Appearance Configuration of Mobile Terminal Next, a specific example of the embodiment will be described. First, an appearance configuration of a mobile terminal 100 that is a specific example of the information processing device 1 described above will be described using FIG. 2.

The mobile terminal 100 includes a substantially flattened rectangular housing 101 that is approximately a size that is able to be grasped by one hand.

A rectangular touch screen 102 is provided on the central portion of a front face 101A of the housing 101. The touch screen 102 includes a liquid crystal panel and a thin transparent touch panel that covers the display surface of the liquid crystal panel. Incidentally, the touch panel is, for example, an electrostatic capacitance type touch panel.

The mobile terminal 100 receives touch operations by a finger (also possible as a touch pen that is compatible with electrostatic capacitance types) on the touch screen 102 as operation inputs by the user.

Furthermore, an operation button 103 is provided in the vicinity of the touch screen 102 on the front face 101A of the housing 101 of the mobile terminal 100.

Here, the mobile terminal 100 is usable whether the rectangular touch screen 102 is orientated to be vertically long (also referred to as vertical) or horizontally long (also referred to as horizontal).

1-2-2. Hardware Configuration of Mobile Terminal

Figure 3:
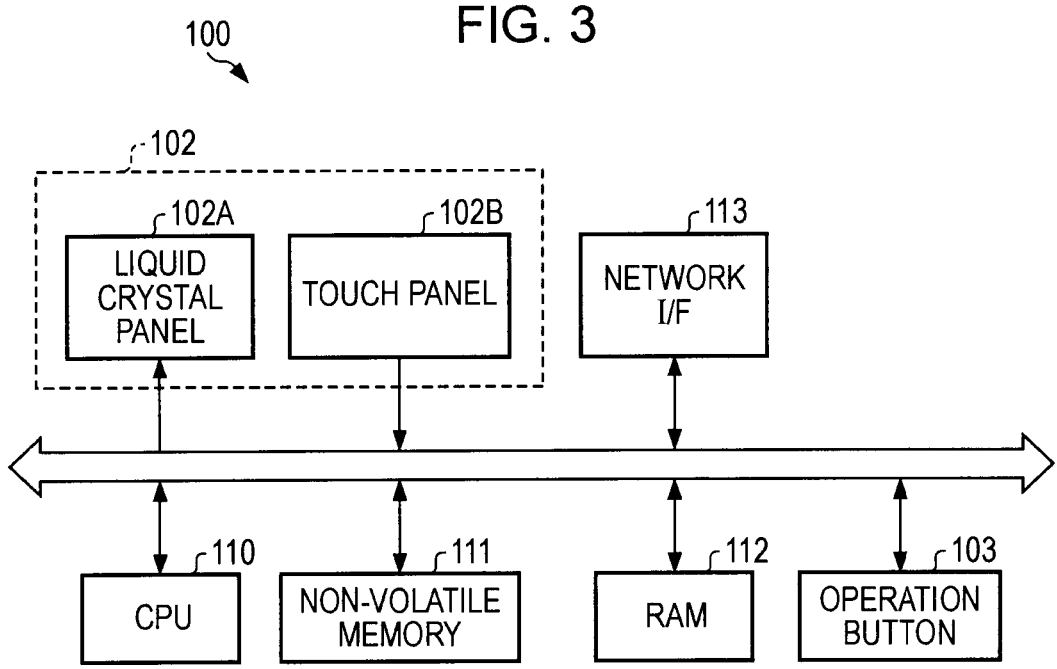
FIG. 3 is a block diagram illustrating a hardware configuration of the mobile terminal.

Next, using FIG. 3, a hardware configuration of the mobile terminal 100 will be described. In the mobile terminal 100, a CPU 110 expands and reads a program stored in a non-volatile memory 111 to a RAM 112, and executes a variety of processing and controls each unit according to the program. Here, CPU is an abbreviation of Central Processing Unit, and RAM is an abbreviation of Random Access Memory.

The touch screen 102 includes a liquid crystal panel 102A that is a display device that displays various pieces of information, and a touch panel 102B that is an operation input device that receives operation inputs.

The touch panel 102B is an electrostatic capacitance type, and includes a plurality of electrostatic sensors (not shown in the drawings) that is arranged in a lattice form on the operating surface. Output values of each of the plurality of electrostatic sensors change according to an electrostatic capacitance that changes as conductors such as a finger approach the operating surface. Specifically, the output value increases, for example, as a conductor approaches the operating surface.

The touch panel 102B sends the output values of each electrostatic sensor that change in such a manner and the positions of each electrostatic sensor to the CPU 110.

Figure 4:
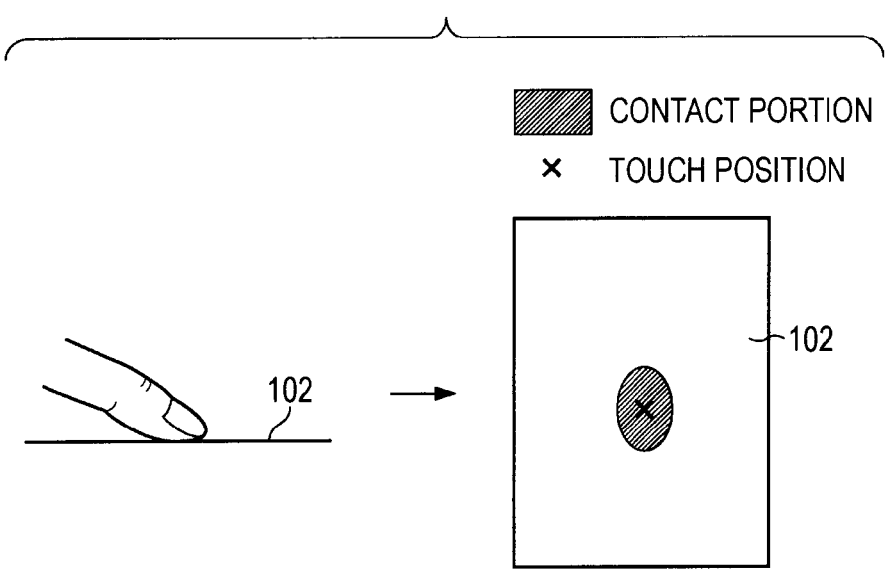
FIG. 4 is a substantially diagrammatical view that accompanies a description of detection of a touch position.

The CPU 110 specifies, based on the above, as illustrated in FIG. 4, portions on the operating surface of the touch panel 102B (that is, on the screen of the liquid crystal panel 102A) with which a finger is in contact. Here, the CPU 110 specifies, for example, portions in which the output value is equal to or greater than a predetermined value as portions with which a finger is in contact.

Furthermore, the CPU 110 recognizes the center of gravity or the center (that is, the center of gravity or the center of the length of a finger that is in contact with the operating surface) of a contact portion as the touch position on the screen.

In addition, the CPU 110 detects changes in the touch position by obtaining, for every predetermined amount of time, the output value and the position of each electrostatic sensor from the touch panel 102B and detecting the touch position from the contact portions.

Furthermore, the CPU 110 recognizes how the touch position moves over the screen (that is, the loci of the touch position) based on such a change.

The CPU 110 specifies, based on the touch position and the loci thereof recognized in such a manner, what sort of touch operation has been performed on the screen, receives such touch operations as operation inputs, and executes processing according to the operation inputs.

Here, the CPU 110 receives touch operations such as touching, tapping, dragging, and flicking as operation inputs.

In addition, the CPU 110 receives, separately from such general touch operations, touch operations of touching and sliding over the screen with the entire length of the finger (capture gesture described later) as operation inputs. In such a case, the CPU 110 calculates the area of the contact portion (that is, the portion of the length of the finger that is touching the screen) based on the area, and recognizes such a gesture operation by differentiating from other touch operations.

Furthermore, when the CPU 110 recognizes a pushing operation on the operation button 103, the CPU 110 receives the pushing operation as an operation input by the user and executes processing corresponding to the operation input.

In addition, the CPU 110 also performs communication by transceiving various data with external apparatuses via a network interface 113.

Figure 5:
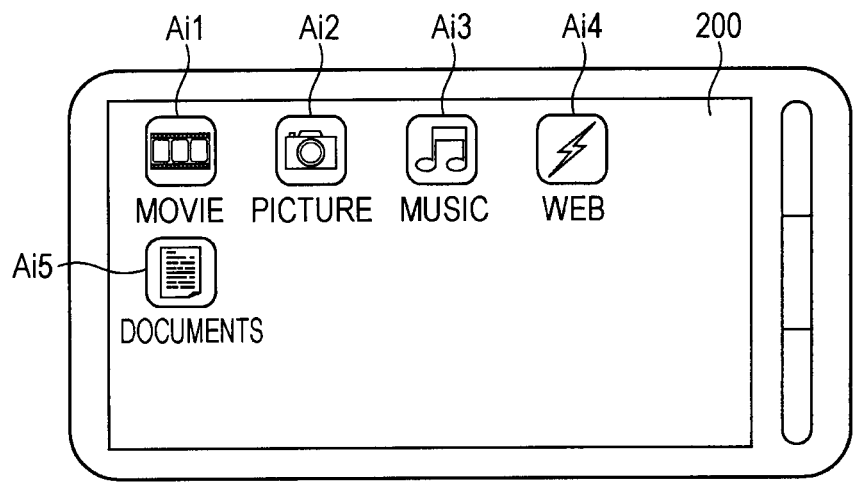
FIG. 5 is a substantially diagrammatical view illustrating a configuration of a home screen.

Here, for example, as illustrated in FIG. 5, it is supposed that a screen 200 on which icons Ai corresponding to each application installed on the mobile terminal 100 are placed (referred to as a home screen) is displayed on the touch screen 102.

Here, FIG. 5 is an example in which a horizontally long home screen 200 is displayed on a horizontal touch screen 102.

Specifically, an icon Ai1 that corresponds to a movie reproduction application, an icon Ai2 that corresponds to a still image display application, and an icon Ai3 that corresponds to a music reproduction application are placed on the home screen 200.

Furthermore, an icon Ai4 that corresponds to a web browser and an icon Ai5 that corresponds to a document viewing application are placed on the home screen 200.

Here, the movie reproduction application is also referred to as a movie app, the still image display application is also referred to as a still image app, the music reproduction application is also referred to as a music app, and the document viewing application is also referred to as a document app.

Here, for example, when the icon Ai1 that corresponds to the movie app is tapped, the CPU 110 of the mobile terminal 100 receives the touch operation as an operation input to launch the movie app.

Further, the CPU 110 launches the video app by reading the program of the movie app from the non-volatile memory 111 and executing the movie app.

When the movie app is launched, the CPU 110 displays the thumbnails of movies that are stored as movie files in the non-volatile memory 111 on the touch screen 102 as a list.

Here, when one of the thumbnails displayed as a list is tapped, the CPU 110 receives the touch operation as an operation input to reproduce the movie.

The CPU 110 then reads the movie file that corresponds to the tapped thumbnail and extracts movie data and sound data from the movie file. Further, the CPU 110 obtains movie signals by performing predetermined reproduction processing such as decode processing and digital analog conversion processing on the movie data, and displays the movie signals on the touch screen 102. Furthermore, the CPU 110 obtains sound signals by performing predetermined reproduction processing such as decode processing, digital analog conversion processing, and amplification processing on the sound data, and outputs the sound signals from headphone ports (not shown in the drawings).

In such a manner, the mobile terminal 100 reproduces a movie that is designated by the user.

Further, when the icon Ai2 that corresponds to a still image app is tapped, the CPU 110 receives the touch operation as an operation input to launch the still image app.

Further, the CPU 110 launches the still image app by reading the program of the still image app from the non-volatile memory 111 and executing the still image app.

When the still image app is launched, the CPU 110 displays the thumbnails of still images that are stored as still image files in the non-volatile memory 111 on the touch screen 102 as a list.

Here, when one of the thumbnails displayed as a list is tapped, the CPU 110 receives the touch operation as an operation input to display the still image.

The CPU 110 then reads the movie file that corresponds to the tapped thumbnail and extracts still image data from the still image file. Further, the CPU 110 obtains still image signals by performing predetermined reproduction processing such as decode processing and digital analog conversion processing on the still image data, and displays the still image signals on the liquid crystal panel 102A of the touch screen 102.

In such a manner, the mobile terminal 100 displays a still image that is designated by the user.

Furthermore, when the icon Ai3 that corresponds to the music app is tapped, the CPU 110 receives the touch operation as an operation input to launch the music app.

Further, the CPU 110 launches the music app by reading the program of the music app from the non-volatile memory 111 and executing the music app.

When the music app is launched, the CPU 110 displays the thumbnails of tracks that are stored as track files in the non-volatile memory 111 on the touch screen 102 as a list.

Here, when one of the thumbnails displayed as a list is tapped, the CPU 110 receives the touch operation as an operation input to reproduce the music.

The CPU 110 then reads the track file that corresponds to the tapped thumbnail and extracts sound data from the track file. Further, the CPU 110 obtains sound signals by performing predetermined reproduction processing such as decode processing, digital analog conversion processing, and amplification processing on the sound data, and outputs the sound signals from headphone ports (not shown in the drawings).

In such a manner, the mobile terminal 100 reproduces a track that is designated by the user.

In addition, at this time, the CPU 110 extracts related information such as the jacket image, the track title, the album title, and the artist name from the read track file, and displays these on the touch screen 102.

In such a manner, the mobile terminal 100 displays, as well as reproducing the track designated by the user, information relating to the track.

Furthermore, when the icon Ai4 that corresponds to the web browser is tapped, the CPU 110 receives the touch operation as an operation input to launch the web browser.

Further, the CPU 110 launches the web browser by reading the program of the web browser from the non-volatile memory 111 and executing the web browser.

Here, the CPU 110 receives, as well as displaying the browser screen on the touch screen 102, page data of the webpage from a server on a network via the network interface 113. Further, the CPU 110 causes a page image that is based on the page data on the browser screen.

In such a manner, the mobile terminal 100 displays a webpage by launching the web browser.

Furthermore, when the icon Ai5 that corresponds to the document viewing app is tapped, the CPU 110 receives the touch operation as an operation input to launch the document viewing app.

Further, the CPU 110 launches the document viewing app by reading the program of the document viewing app from the non-volatile memory 111 and executing the document viewing app.

When the document viewing app is launched, the CPU 110 displays the titles of documents that are stored as document files in the non-volatile memory 111 on the touch screen 102 as a list.

Here, when one of the titles displayed as a list is tapped, the CPU 110 receives the touch operation as an operation input to display the document.

The CPU 110 then reads the document file that corresponds to the tapped title and extracts document data from the document file. Further, the CPU 110 displays a document based on the document data on the touch screen 102.

Here, without being limited to document data, image data may be included in a document file. In such a case, the CPU 110 displays, while displaying a document based on the document data, an image based on the image data in a designated position in the document.

In such a manner, the mobile terminal 100 displays a document (or document+image) that is designated by the user.

Furthermore, the document terminal 100 is able to save the display contents of the screen that are displayed on the touch screen 102 to be able to restore them later. Here, such a function is referred to as resume capture, and an operation method of the resume capture is described in detail below.

Incidentally, a specific example of the hardware of the operation unit 2 of the information processing device 1 described in the outline of the embodiment is the touch panel 102B of the mobile terminal 100 described above. Further, a specific example of the hardware of the control unit 3 of the information processing device 1 is the CPU 110 of the mobile terminal 100. Furthermore, a specific example of the hardware of the display unit 4 of the information processing device 1 is the liquid crystal panel 102A of the mobile terminal 100. Furthermore, a specific example of the hardware of the memory unit 5 of the information processing device 1 is the non-volatile memory 111 of the mobile terminal 100.

1-2-3. Operation Method of Resume Capture

Here, although an operation method in a case when a resume capture is performed with the document viewing app is described as an example, the basic operation method is the same in cases when other apps are used.

As described above, in a state in which the titles of documents are displayed as a list, if one of the titles is tapped, the CPU 110 of the mobile terminal 100 reads a document file that corresponds to the tapped title and obtains document data.

Figure 6:
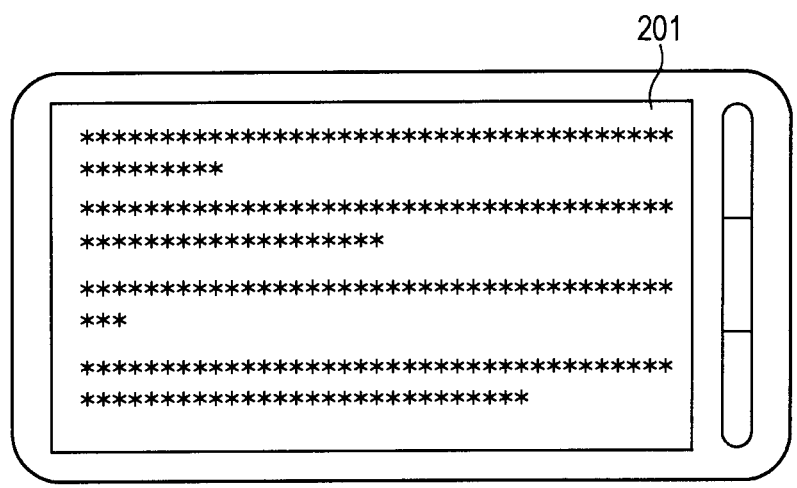
FIG. 6 is a substantially diagrammatical view illustrating a configuration of a document display screen.

Further, at this time, the CPU 110 displays, as illustrated in FIG. 6, a document display screen 201 on the touch screen 102.

Here, FIG. 6 is an example in which a document display screen 201 that is horizontally long is displayed on a horizontal touch screen 102.

The CPU 110 displays a document based on document data obtained from the read document file on the document display screen 201. At this time, the CPU 110 firstly displays, out of the entire document, the beginning of the document equivalent to one screen.

Here, FIG. 6 is an example in which several lines of the horizontally-written document that fit on one screen are displayed on the document display screen 201.

Here, in the document display screen 201, the document is able to be scrolled in arbitrary directions.

Specifically, the CPU 110 scrolls, for example, the document in the upward direction according to a drag in the upward direction of the screen and scrolls the document in the downward direction according to a drag in the downward direction of the screen.

In such a manner, on the document display screen 201, it is possible to scroll through the displayed document, and it is thus possible to allow the user to view the entire document.

Furthermore, on the document display screen 201, it is possible to save the contents currently being displayed on the screen by a gesture operation to be able to restore them later, that is, it is possible to resume capture.

Figure 7:
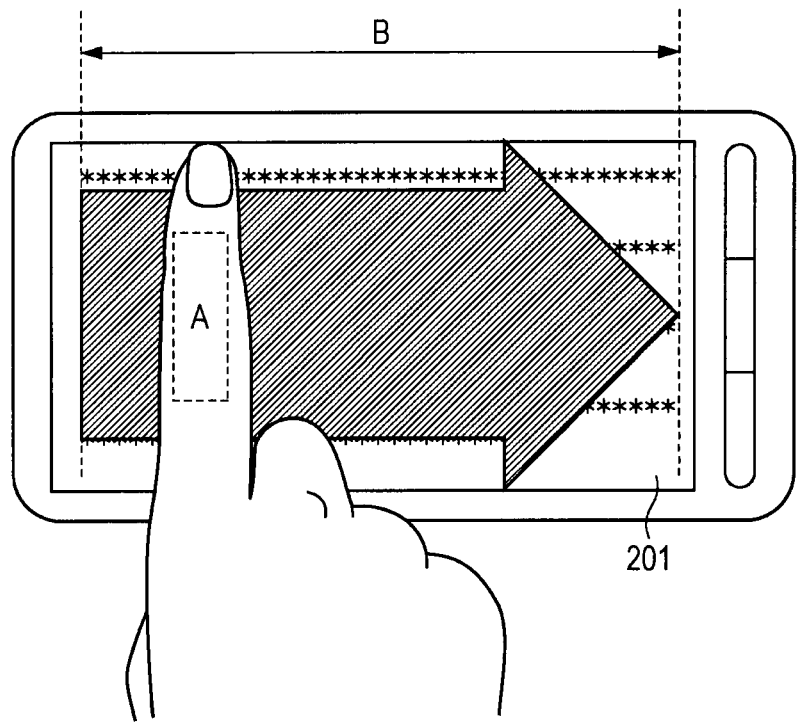
FIG. 7 is a substantially diagrammatical view that accompanies a description of a display of a capture gesture.

In actuality, in order to resume capture, as illustrated in FIG. 7, a gesture operation in which the edge of the document display screen 201 (for example, the left edge) is touched by the entire length of one finger and the finger is slid in a horizontal direction of the screen (for example, to the right), as if reading by a scanner apparatus, is performed. Such a gesture operation is referred to as a capture gesture below.

Here, when a drag is performed in a horizontal direction of the screen in a state in which the area of the contact portion is equal to or greater than the area of a predetermined rectangle A, and the length of the drag becomes equal to or greater than a predetermine value B, the CPU 110 determines the operation as a capture gesture. Here, the area of the rectangle A is set, for example, based on the area of the contact portion in a case when a person with an average sized finger touches the screen with the entire length of the index finger (for example, set to a size that is 80% of such an area). Further, the predetermined value B is set, for example, based on the horizontal length of the screen (for example, set to a length that is 80% of the width of the screen).

The CPU 110 then captures the current document display screen 201 as a still image, and saves the still image in the RAM 112. Here, an image captured in such a manner is referred to hereinafter as a screen capture image.

Furthermore, at this time, the CPU 110 obtains information, out of the entire document (that is, from the beginning to the end), indicating the range that is currently being displayed on the document display screen 201 (such information is also referred to as display range information).

In actuality, the document display screen 201 is able, as described above, to scroll in the vertical direction of the screen. Here, with the state of displaying the beginning of the document equivalent to one screen on the document display screen 201 as a reference, by obtaining the scrolling amount from such a state to the range that is currently being displayed, it is possible to specify the range that is currently being displayed based on the scrolling amount.

The CPU 110 therefore obtains the scrolling amount as display range information. Here, for example, in a state in which the beginning of the document equivalent to one screen is displayed (that is, when there has been no scrolling), the scrolling amount is 0. Here, if the number of vertical pixels of the document display screen 201 is, for example, 480, the scrolling amount after scrolling in the downward direction by the equivalent of one screen is 480, and the scrolling amount after scrolling in the downward direction by the equivalent of two screens is 960.

The CPU 110 makes the display range information, a pass of the document that indicates the save point of the document that is currently being displayed, and the name of the app (document viewing app) correspond with the screen capture image that is temporarily saved earlier in the RAM 112 and stores these in the RAM 112.

Here, the pass includes the file name of the document file. That is, the pass is said to be information (identification information) that is able to identify the document that is currently being displayed. In other words, as long as it is information that is able to identify the document, information other than the pass (for example, an ID that is assigned to every document) may be used as the restoration information.

The display range information, the pass of the document file, the name of the app, and the screen capture image are the information for later restoring the display contents of the document display screen 201 that are currently being displayed, and here, these are called restoration information.

Figure 8:
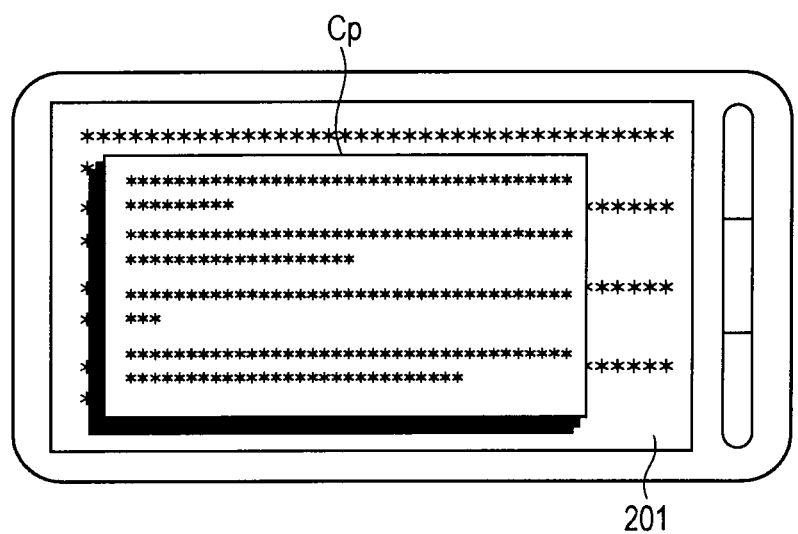
FIG. 8 is a substantially diagrammatical view that accompanies a description of a display of a screen capture image.

The CPU 110 displays, when restoration information is temporarily saved in the RAM 112, as illustrated in FIG. 8, a screen capture image Cp that has been reduced to a size that is smaller than the screen size (for example, to 80%) on the document display screen 201 as a pop-up.

Figure 9:
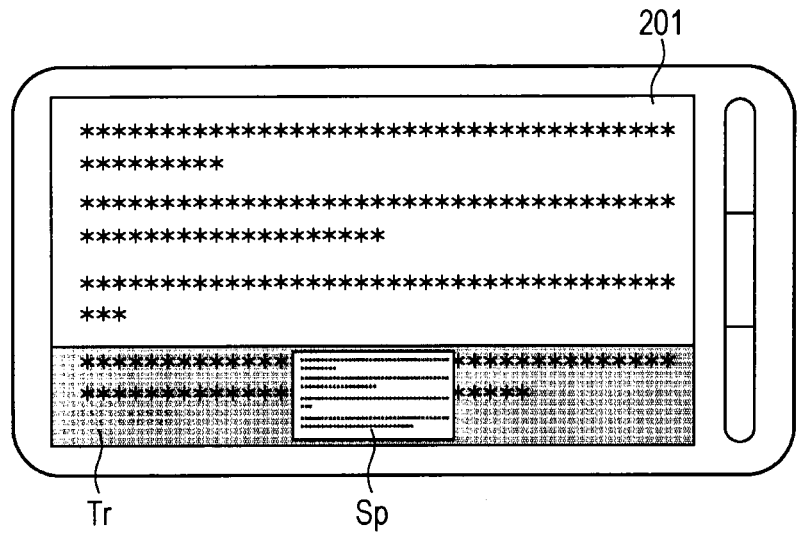
FIG. 9 is a substantially diagrammatical view that accompanies a description of a display of a tray and a display of a thumbnail capture image in the tray.

When the screen capture image Cp is displayed and a certain amount of time (for example, several seconds) passes, the CPU 110 displays, as illustrated in FIG. 9, a semi-transparent tray Tr at the bottom of the document display screen 201.

The tray Tr is displayed so as to be able to be drawn out from the bottom of the document display screen 201, and the tray Tr covers, for example, when drawn out all the way, approximately one quarter of the document display screen 201 from the bottom.

Here, the CPU 110 pastes the screen capture image Cp on the tray Tr by reducing the screen capture image Cp to a size that is able to be displayed within the tray Tr and making a thumbnail thereof. As a result, the screen capture image Cp is displayed in the center of the tray Tr as a thumbnail. Here, the screen capture image Cp that has been made into a thumbnail is hereinafter referred to as a thumbnail capture image Sp.

In such a manner, the CPU 110 makes, when a capture gesture is performed, after displaying the screen capture image CP as a pop-up for a predetermined amount of time, a thumbnail of the screen capture image Cp and pastes the screen capture image Cp to the tray Tr that has been drawn out over the document display screen 201.

In so doing, the mobile terminal 100 recognizes the capture gesture and allows the user to check that the display contents of the current document display screen 201 have been saved so as to be able to be restored later (that is, that a resume capture has been performed).

Thereafter, once a predetermined amount of time passes, the CPU 110 clears, by leaving the top portion of the tray Tr at the bottom of the document display screen 201, portions other than the top portion from the document display screen 201 (not shown in the drawings).

After pasting the thumbnail capture image Sp on the tray Tr in such a manner, by leaving a portion (top portion) of the tray Tr on the screen, the fact that the thumbnail capture image Sp is present within the tray Tr is able to be recognized by the user.

The tray Tr is able to be drawn out over the screen at any time by touching the top portion and flicking in the upward direction of the screen.

Further, the tray Tr continues to be displayed even after the document viewing app is ended and the screen switches from the document display screen 201 to another screen (for example, the home screen 200).

Figure 10:
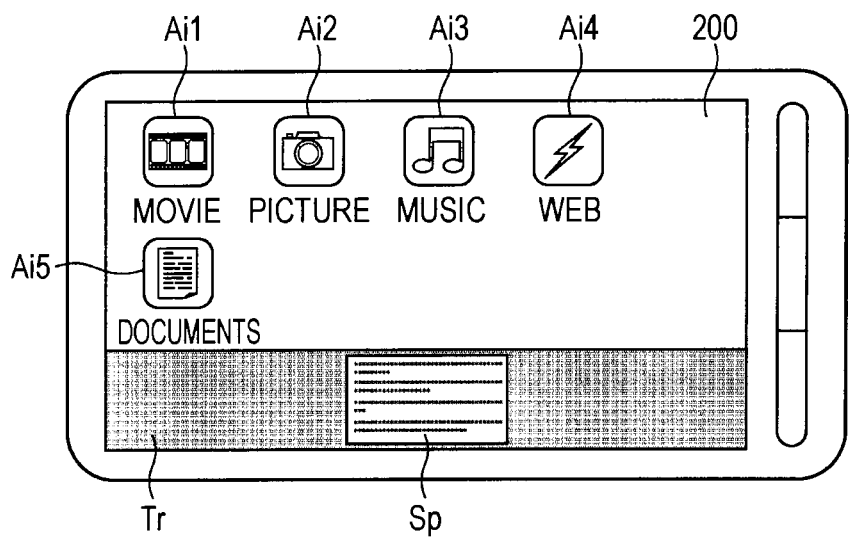
FIG. 10 is a substantially diagrammatical view that accompanies a description of a display of the tray on the home screen.

Here, when the top portion of the tray that is being displayed at the bottom of the home screen 200 is touched and a drag is performed in the upward direction of the screen, the CPU 110 draws out, as illustrated in FIG. 10, the whole of the tray Tr over the home screen 200.

The thumbnail capture image Sp from the resume capture of the document display screen 201, for example, is displayed in the tray Tr.

Figure 11:
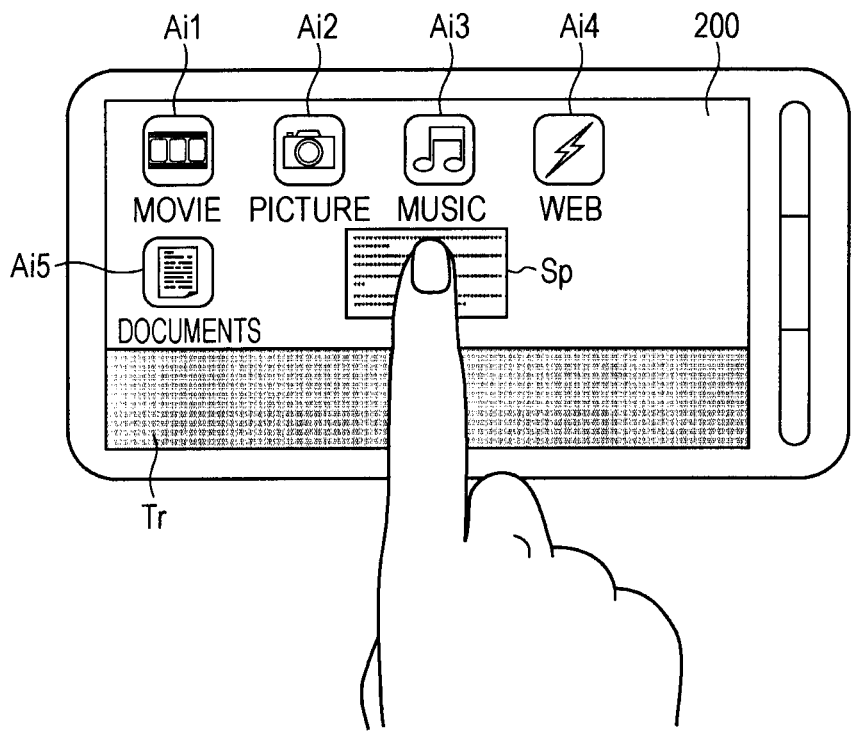
FIG. 11 is a substantially diagrammatical view that accompanies a description of a drag-and-drop of the thumbnail capture image.

At this time, on the home screen 200, as illustrated in FIG. 11, the thumbnail capture image Sp is able to be pasted from the tray Tr to an arbitrary position by a drag-and-drop (specifically, touch→drag→release).

Figure 12:
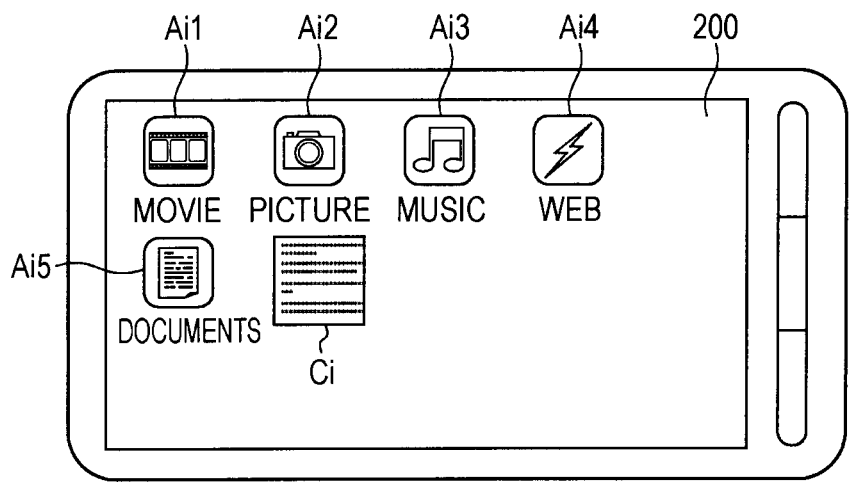
FIG. 12 is a substantially diagrammatical view that accompanies a description of when the thumbnail capture image is pasted as a capture icon.

In actuality, it is supposed that the thumbnail capture image Sp in the tray Tr is drag-and-dropped onto an arbitrary position on the home screen 200. The CPU 110 then makes, as illustrated in FIG. 12, an icon of the thumbnail capture image Sp by, for example, adjusting the thumbnail capture image Sp to be the same shape and size as the other icons Ai, and pastes the thumbnail capture image Sp on an arbitrary position on the home screen 200. Here, the thumbnail capture image Sp that has been made into an icon is hereinafter also referred to as a capture icon Ci.

In such a manner, the capture icon Ci is an icon in which the screen at the time of a resume capture has been captured and reduced, and by the capture icon Ci, the user is able to check what sort of screen has been resume captured.

Further, at this time, the CPU 110 makes the restoration information that corresponds to the thumbnail capture image Sp, which has been temporarily saved in the RAM 112 correspond with the pasted capture icon Ci and stores the restoration information in the non-volatile memory 111.

The restoration information for later restoring the display contents of the screen at the time of a resume capture is thus stored in the mobile terminal 100.

Thereafter, when the capture icon Ci that is pasted on the home screen 200 is tapped, the CPU 110 reads a restoration file that is made to correspond with the capture icon Ci from the non-volatile memory 111.

As described above, the display range information, the pass of the document file, the name of the app, and the screen capture image of when the document display screen 201 was resume captured are, for example, included as the restoration information in the restoration file.

Here, the CPU 110 reads the document file from the non-volatile memory 111 based on the pass of the document file, and obtains the document data.

Furthermore, at this time, the CPU 110 launches the document viewing app based on the name of the app and displays the document display screen 201 on the touch screen 102. The CPU 110 then displays, in a state of scrolling by the scrolling amount indicated by the display range information, the document based on the document data on the document display screen 201.

As a result, the contents that were being displayed on the document display screen 201 at the time of the resume capture are restored as is.

In such a manner, the user is able to recheck the contents that were being displayed on the document display screen 201 at the time of the resume capture.

Furthermore, in such a case, the display contents are able to be restored by displaying the document in a state of scrolling by the same scrolling amount as the time of the resume capture, and thereafter, the document is able to be scrolled by performing a drag in the vertical direction of the screen.

Here, although it is also possible to restore the display contents by displaying the screen capture image Cp from the time of the resume capture, in such a case, since only one screen capture image is displayed, it is not possible to perform operations such as to scroll through the document.

Accordingly, in the mobile terminal 100, by restoring the display contents of the document display screen 201 based on the name of the app and the pass and the scrolling amount of the document file, the display contents are able to be restored in a state in which the same operations as those at the time of the resume capture are possible.

Here, in the mobile terminal 100, the screen capture image Cp is used for the capture icon Ci that is made to correspond with the restoration information at the time of the resume capture, or the like.

Furthermore, here, although an operation method in a case when a resume capture is performed with the document viewing app has been described as an example, an operation method in a case when a resume capture is performed with the movie app is the same.

That is, when the CPU 110 recognizes that a capture gesture has been performed in a state in which the movie app has been launched and an arbitrary movie is being reproduced on the movie reproduction screen (not shown in the drawings), the CPU 110 resume captures the current movie reproduction screen.

At this time, the CPU 110 temporarily saves the screen capture image of the movie reproduction screen in the RAM 112. Further, the CPU 110 temporarily saves the pass of the movie file that indicates the save point of the movie that is being reproduced on the movie reproduction screen, reproduction information that indicates the reproduction position and the reproduction speed at that time, and the name of the app in the RAM 112. Here, in such a case, information other than the pass (for example, an ID that is assigned to every movie) may, as long as it is information that is able to identify the movie that is being reproduced, be used as the restoration information.

The screen capture image, the pass of the movie file, the reproduction information, and the name of the app are the restoration information for later restoring the display contents that are currently being displayed on the movie reproduction screen.

That is, thereafter, the CPU 110 launches the movie app based on the restoration information. Further, the CPU 110 restores the display contents of the movie reproduction screen by reproducing the movie that was being reproduced at the time of the resume capture from the reproduction position at that time and at the reproduction speed at that time.

In such a manner, the mobile terminal 100 is able to perform a resume capture with the movie app by the same operation (capture gesture) as with the document viewing app.

In addition, an operation method in a case when performing a resume capture with the still image app is the same.

That is, when the CPU 110 recognizes that a capture gesture has been performed in a state in which the still image app has been launched and an arbitrary still image is being displayed on the still image display screen (not shown in the drawings), the CPU 110 resume captures the current still image display screen.

At this time, the CPU 110 temporarily saves the screen capture image of the still image display screen in the RAM 112. Further, the CPU 110 temporarily saves the pass of the still image file that indicates the save point of the still image that is being displayed on the still image display screen, zoom information that indicates the center position of the zoom and the rate of zoom at that time, and the name of the app in the RAM 112.

The screen capture image, the pass of the still image file, the zoom information, and the name of the app are the restoration information for later restoring the display contents that are currently being displayed on the still image display screen.

That is, thereafter, the CPU 110 launches the still image app based on the restoration information. Further, the CPU 110 restores the display contents of the still image display screen by zooming into the still image that was being displayed at the time of the resume capture centered on the center position of the zoom that was set at that time by a rate of zoom at that time.

In such a manner, the mobile terminal 100 is able to perform a resume capture with the still image app by the same operation (capture gesture) as with the document viewing app.

In addition, an operation method in a case when performing a resume capture with the music app is the same.

That is, when the CPU 110 recognizes that a capture gesture has been performed in a state in which the music app has been launched and an arbitrary track is being reproduced on the music reproduction screen (not shown in the drawings), the CPU 110 resume captures the current music reproduction screen.

At this time, the CPU 110 temporarily saves the screen capture image of the music reproduction screen in the RAM 112. Further, the CPU 110 temporarily saves the pass of the track file that indicates the save point of the music that is being reproduced on the music reproduction screen, reproduction information that indicates the reproduction position and the reproduction speed at that time, and the name of the app in the RAM 112.

The screen capture image, the pass of the track file, the reproduction information, and the name of the app are the restoration information for later restoring the display contents that are currently being displayed on the music reproduction screen.

That is, thereafter, the CPU 110 launches the music app based on the restoration information. Further, the CPU 110 restores the display contents of the music reproduction screen by reproducing the music that was being reproduced at the time of the resume capture from the reproduction position at that time and at the reproduction speed at that time.

In such a manner, the mobile terminal 100 is able to perform a resume capture with the music app by the same operation (capture gesture) as with the document viewing app.

In addition, an operation method in a case when performing a resume capture with the web browser is the same.

That is, when the CPU 110 recognizes that a capture gesture has been performed in a state in which the web browser has been launched and an arbitrary webpage is being displayed on the browser screen (not shown in the drawings), the CPU 110 resume captures the current browser screen.

At this time, the CPU 110 temporarily saves the screen capture image of the browser screen in the RAM 112. Further, the CPU 110 temporarily saves the address of the webpage that is being displayed on the browser screen, the display range information that indicates the range over which there is display on the browser screen at that time, and the name of the app in the RAM 112. The display range information in such a case is, with a state in which the top of the webpage that is equivalent to one screen is being displayed, the scrolling amount from such a state to the range that is currently being displayed.

The screen capture image, the address of the webpage, the display range information (scrolling amount), and the name of the app are the restoration information for later restoring the display contents that are currently being displayed on the web browser.

That is, thereafter, the CPU 110 launches the web browser based on the restoration information. Further, the CPU 110 restores the display contents of the browser screen by displaying, in a state of scrolling by the scrolling amount indicated by the display range information, the webpage that was being displayed at the time of the resume capture.

In such a manner, the mobile terminal 100 is able to perform a resume capture with the web browser by the same operation (capture gesture) as with the document viewing app.

As has been described up to this point, when a capture gesture is performed, the mobile terminal 100 obtains restoration information for later restoring the display contents of the screen that are being displayed on the touch screen 102 at that time.

Furthermore, the mobile terminal 100 pastes the capture icon Ci that is made to correspond with the restoration information to the home screen 200 and stores the restoration in the non-volatile memory 111.

In addition, thereafter, when the capture icon Ci that is made to correspond with the restoration is tapped, the mobile terminal 100 restores the contents that were being displayed on the screen at the time of the resume capture.

In so doing, the mobile terminal 100 is able to allow the user to recheck the contents that were being displayed on the screen when the resume capture was performed.

Further, in the mobile terminal 100, the capture gesture operation from the time of a resume capture is a gesture operation in which the edge of the screen is touched by the entire length of one finger and the finger is slid in the horizontal direction, as if reading by a scanner apparatus.

In so doing, a resume capture is able to be performed on the mobile terminal 100 by an intuitive and simple operation as if to scan the screen with a finger.

Furthermore, in the mobile terminal 100, by storing the display range information, the reproduction information, the zoom information, the name of the app, the pass of the file, and the like as restoration information at the time of a resume capture, it is possible to restore, based thereon, the display contents of the screen at the time of the resume capture.

In so doing, in the mobile terminal 100, the display contents of the screen are able to be restored in a state in which the same operation as when the resume capture was performed is possible.

1-2-4. Resume Capture Processing Procedure

Next, a specific processing procedure that is executed when the mobile terminal 100 performs a resume capture will be described using the flowchart illustrated in FIG. 13.

Figure 13:
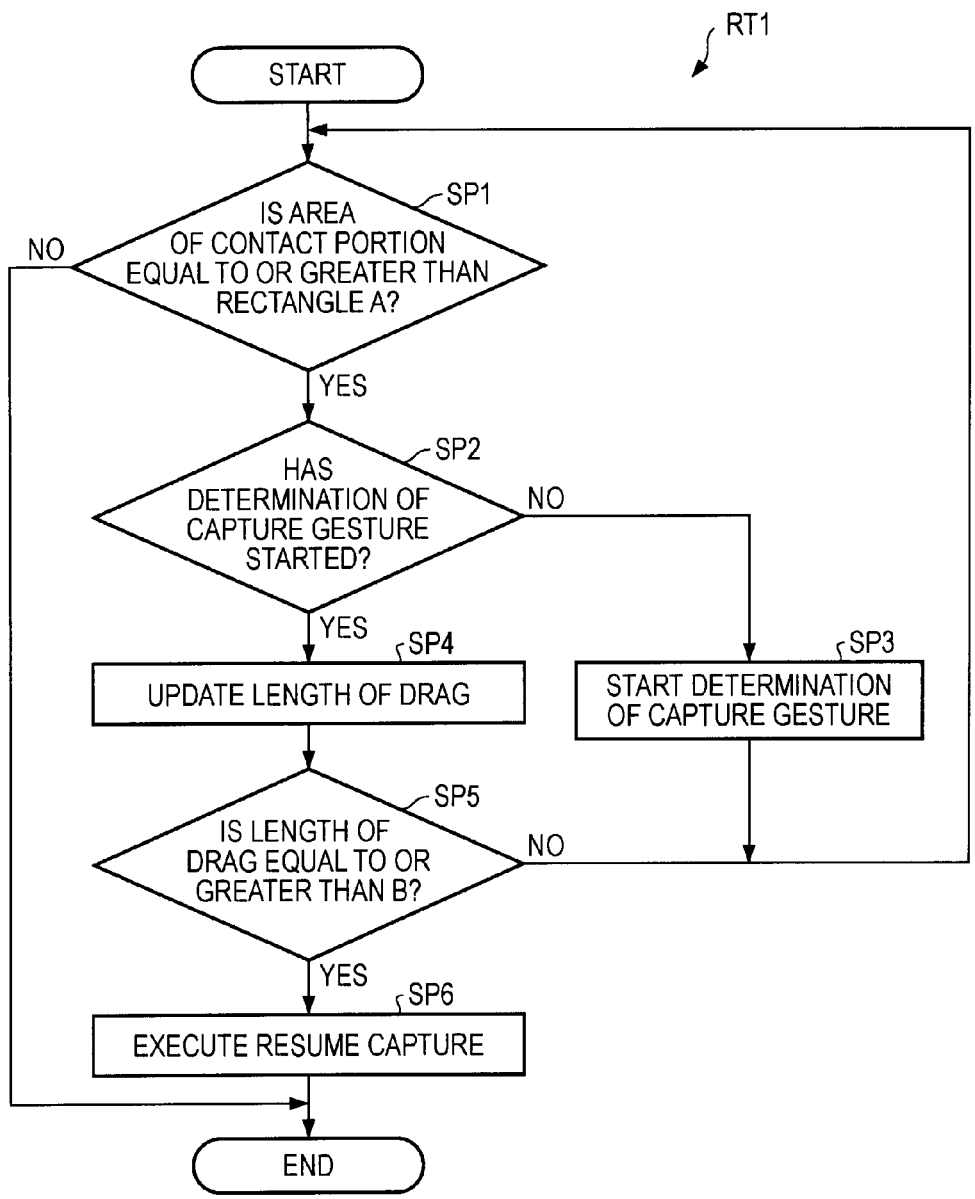
FIG. 13 is a flowchart that illustrates a resume capture processing procedure.

Here, a resume capture processing procedure RT1 illustrated in FIG. 13 is processing that is executed by the CPU 110 of the mobile terminal 100 according to a program stored in the non-volatile memory 111.

When the CPU 110 recognizes, for example, in a state in which the document display screen 201 is displayed, that a finger has touched the touch panel 102B, the CPU 110 begins the processing procedure RT1 and proceeds to step SP1.

In step SP1, the CPU 110 determines whether or not the area of a portion on which a finger is in contact (contact portion) on the touch panel 102B is equal to or greater than the area of the predetermined rectangle A. If an affirmative result is obtained in the step SP1, the CPU 110 proceeds to step SP2.

In step SP2, the CPU 110 determines whether or not the capture gesture is being determined. Here, if a negative result is obtained in the step SP2 due to the determination of the capture gesture not being started, the CPU 110 proceeds to step SP3, begins determination of the capture gesture, and returns once again to step SP1.

On the other hand, if an affirmative result is obtained in the step SP2 due to the determination of the capture gesture already being started, the CPU 110 proceeds to step SP4.

In step SP4, the CPU 110 updates the length of a drag by adding the distance between the last touch position and the current touch position to the length of a drag up to that point, and proceeds to step SP5.

In step SP5, the CPU 110 determines whether or not the length of the drag at this point is equal to or greater than the predetermined value B.

If a negative result is obtained in the step SP5, the result signifies that the touch operation at this time is not a capture gesture. At this time, the CPU 110 returns once again to step SP1.

On the other hand, if a positive result is obtained in the step SP5, the result signifies that the touch operation at this time is a capture gesture. At this time, the CPU 110 determines the touch operation at this time as a capture gesture and proceeds to step SP6.

In step SP6, the CPU 110 ends the determination of the capture gesture, performs a resume capture, and ends the resume capture processing procedure RT1.

Further, the CPU 110 ends the resume capture processing procedure RT1 also in a case when, in step SP1 described above, a negative result is obtained by the area of the contact portion being less than the area of the rectangle A.

The CPU 110 determines a capture gesture according to such a resume capture processing procedure RT1, and a resume capture is performed according to the determined capture gesture.

1-2-5. Actions and Effects

By the above configuration, the CPU 110 of the mobile terminal 100 determines an operation of when a drag is performed in the horizontal direction of the screen in a state in which the area of the contact portion is equal to or greater than the area of the predetermined rectangle A and the length of the drag becomes equal to or greater than the predetermined value B as a capture gesture.

The CPU 110 then obtains the restoration information for later restoring the display contents that are on the screen at this time. Further, the CPU 110 pastes, according to a user operation, the capture icon Ci that is made to correspond with the restoration information on the home screen 200 and stores the restoration information in the non-volatile memory 111.

Thereafter, when the capture icon Ci is tapped, the CPU 110 reads the restoration information that is made to correspond with the capture icon Ci and restores, based thereon, the contents that were being displayed on the screen when the resume capture was performed.

In so doing, the mobile terminal 100 is able to allow the user to recheck the contents that were being displayed on the screen at the time of the resume capture.

In addition, the CPU 110 stores the display range information, the reproduction information, the zoom information, the name of the app, the pass of the file, and the like at the time of the resume capture as restoration information, and restores, based thereon, the display contents of the screen of when the resume capture was performed.

In so doing, the mobile terminal 100 is able to restore the display contents of the screen in a state in which the same operation as the time of the resume capture is possible.

By the above configuration, the mobile terminal 100 stores, according to a capture gesture in which the length of a finger is slid while in contact, the restoration information for later restoring the screen that is currently being displayed in the non-volatile memory 111. In so doing, it is possible to later restore the display contents of the current screen by a simple operation. Therefore, it is possible to considerably improve the usability compared to the related art.

2. Other Embodiments 2-1. Other Embodiment 1

Here, in the embodiment described above, when an operation in which the screen is touched by the length of one finger and the finger is slid in the horizontal direction of the screen is performed, the operation is determined to be a capture gesture and the restoration information is temporarily saved in the RAM 112.

Here, the restoration information that is temporarily saved may be changed between a case when the screen is touched by the entire length of one finger and a case when the screen is touched by the entire lengths of two fingers.

For example, in a case when the screen is touched by the entire length of one finger, simply, only the screen capture image is temporarily saved as restoration information. In such a case, the mobile terminal 100 restores, thereafter, when the capture icon Ci that is made to correspond with the restoration information is tapped, the display contents of the document display screen 201 by displaying the screen capture image on the touch screen 102. In this case, therefore, it is not possible to scroll through the document or the like.

On the other hand, in a case when the screen is touched by the entire lengths of two fingers, similarly to the embodiment described above, for example, the pass of the document file, the display range information (scrolling amount), and the name of the app are temporarily saved, as well as the screen capture image, as restoration information.

In so doing, by simply changing the number of fingers with which to touch, a resume capture is able to be performed by selecting whether to only store the screen capture image as restoration information or to store, along with the screen capture image, the pass of the document file, the display range information, and the name of the app as restoration information.

Figure 14:
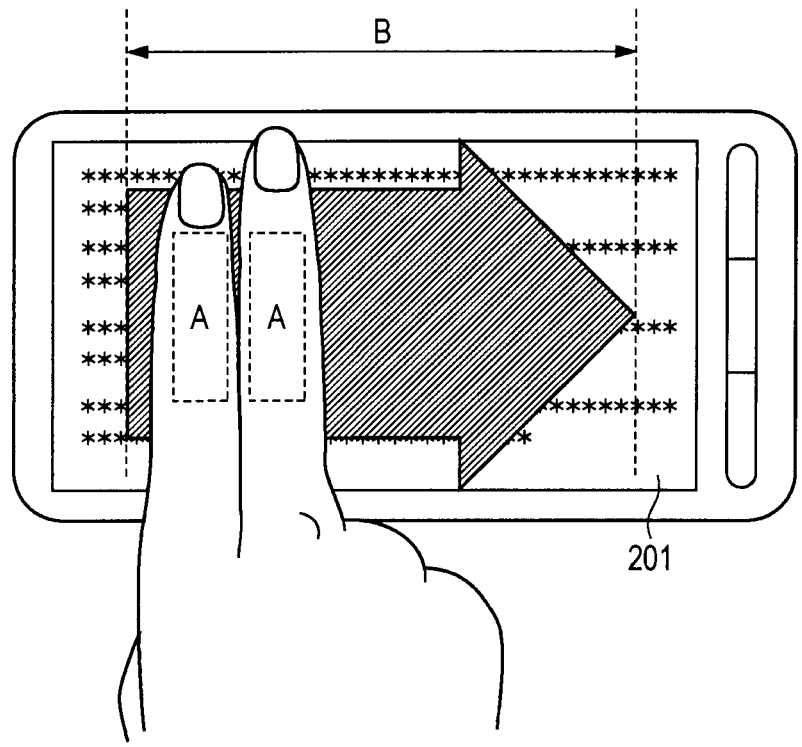
FIG. 14 is a substantially diagrammatical view that accompanies a description of a capture gesture by two fingers.

Here, in such a case, the CPU 110 of the mobile terminal 100 recognizes, for example, in a case when there is one contact portion and the area thereof is equal to or greater than the area of the predetermined rectangle A, that the screen is touched by the length of one finger. On the other hand, as illustrated in FIG. 14, in a case when there are two contact portions and the area of each is equal to or greater than the area of the predetermined rectangle A, it is recognized that the screen is touched by the lengths of two fingers.

Further, even if there is only one contact portion, in a case when, for example, the area thereof is the area of the predetermined rectangle A×2, it is recognized that the screen is touched by two fingers.

Furthermore, in a case when there is such a situation in which the screen is touched by two fingers, the condition of the length of the drag that is determined to be a capture gesture may be shortened.

2-2. Other Embodiment 2

In addition, in the embodiment described above, an operation in a case when a drag is performed in the horizontal direction of the screen in a state in which the area of the contact portion is equal to or greater than the area of the predetermined rectangle A and the length of the drag becomes equal to or greater than the predetermined value B is determined to be a capture gesture and a resume capture is performed.

Figure 15:
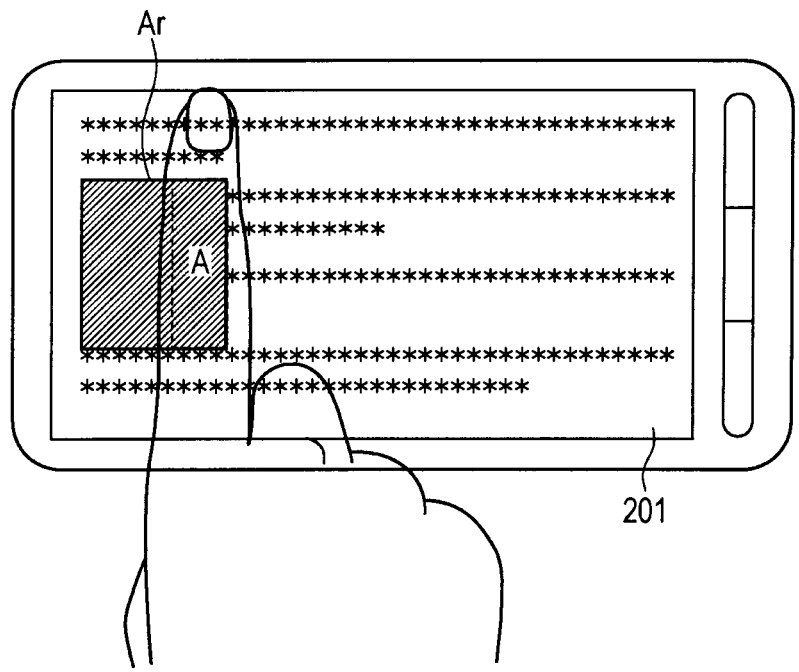
FIG. 15 is a substantially diagrammatical view that accompanies a description of a feedback display of a contact range.

Here, as illustrated in FIG. 15, by the CPU 110 of the mobile terminal 100 actually displaying a range Ar that is recognized as the contact portion during a drag on the screen, the recognized touch operation may be fed back to the user by being displayed on the screen.

In so doing, the user is able to check whether a touch operation that they are performing is being recognized by the mobile terminal 100 in the way that they intend by looking at the contact range Ar.

2-3. Other Embodiment 3

In addition, in the embodiment described above, an operation in a case when a drag is performed in the horizontal direction of the screen in a state in which the area of the contact portion is equal to or greater than the area of the predetermined rectangle A and the length of the drag becomes equal to or greater than the predetermined value B is determined to be a capture gesture.

Here, with the condition that the area of the contact portion is equal to or greater than the area of the rectangle A, the values of the areas may simply be compared, or the vertical length and the horizontal width of the rectangle A may be compared.

In actuality, the CPU 110 determines, in a case when both of the vertical length and the horizontal width of the contact portion are equal to or greater than the vertical length and the horizontal width of the rectangle A, that the area of the contact portion is equal to or greater than the rectangle A.

In so doing, it becomes possible to more accurately determine whether or not the screen is being touched with the entire length of a finger.

Furthermore, in the embodiment described above, the area of the rectangle A is set based on the area of the contact portion in a case when a person with fingers of an average size touches the screen with the entire length of the index finger.

Without limiting thereto, if a capture gesture is to be distinguished from a regular drag, the area of the rectangle A may be set based on the area of the contact portion in a case when the fingertip of a finger of an average size touches the screen (for example, set to a size that is 120% of such an area).

Further, the condition that the length of the drag be equal to or greater than the predetermined value B may be omitted.

In such a case, an operation when the screen is continuously touched for equal to or greater than a predetermined amount of time in a state in which the area of the contact portion is equal to or greater than the area of the rectangle A may be determined to be a capture gesture, or the like.

2-4. Other Embodiment 4

In addition, in the embodiment described above, when a capture gesture is performed, the CPU 110 automatically displays the screen capture image Cp as a pop-up, and, thereafter, draws out the tray Tr and pastes the screen capture image Cp into the tray Tr.

Without limiting thereto, for example, the pasting of the screen capture image Cp into the tray Tr may be switched from automatic to manual.

In such a case, the CPU 110 draws out, for example, the tray Tr on the screen once a predetermined amount of time passes after the screen capture image Cp is displayed as a pop-up.

Here, if the screen capture image Cp is drag-and-dropped into the tray Tr, the CPU 110 makes a thumbnail of the screen capture image Cp and pastes the screen capture image Cp into the tray Tr.

Furthermore, on the other hand, if a portion other than the screen capture image Cp is tapped after the screen capture image Cp is displayed as a pop-up, the screen capture image Cp may be cleared from the screen. Here, in a case when the tray Tr is displayed, the tray Tr is also cleared.

At this time, the CPU 110 also clears the restoration information that has been temporarily saved in the RAM 112. As a result, the resume capture is cancelled.

Further, without limiting thereto, if the screen capture image Cp is not drag-and-dropped after displaying as a pop-up and displaying on the tray Tr, and a predetermined amount of time passes, the resume capture may be cancelled.

2-5. Other Embodiment 5

In addition, in the embodiment described above, when a capture gesture is performed, the screen capture image Cp is displayed as a pop-up, and a after a predetermined amount of time passes, a thumbnail is made of the screen capture image Cp and the screen capture image Cp is automatically pasted into the tray Tr. Furthermore, thereafter, if the thumbnail capture image Sp is drag-and-dropped from the tray Tr on the home screen 200 to an arbitrary position on the home screen 200, an icon is made of the thumbnail capture image Sp and the thumbnail capture image Sp is pasted to an arbitrary position.

Without limiting thereto, for example, once the capture gesture is performed, the screen capture image Cp may be displayed as a pop-up, and after a certain amount of time passes, an icon may be made of the screen capture image Cp automatically and the screen capture image Cp may be pasted onto an unoccupied position on the home screen 200.

In so doing, the operations that follow a capture gesture is omitted and made automatic, and the usability is able to be improved.

Here, in such a case, the fact that an icon is made of the screen capture image Cp and the screen capture image Cp is pasted to the home screen 200, that is, the fact that the resume capture has been executed normally, may be displayed on the screen and communicated to the user by the CPU 110.

Furthermore, in such a case, the fact that the resume capture has been executed normally may be displayed on the screen by also omitting the display of the screen capture image Cp as a pop-up.

2-6. Other Embodiment 6

In addition, in the embodiment described above, a case when a resume capture is performed by the movie app, the still image app, the music app, the web browser, or the document viewing app has been described.

Without limiting thereto, a resume capture is able to be performed by the same method by various other applications as long as they are applications that at least display a screen.

For example, a resume capture may be performed with an application that manages an address book (also referred to as an address management app).

Here, it is supposed that the address management app is an app that displays, for example, the name, an e-mail address, a telephone number, an address, and the like of an arbitrary person on a screen. In such a case, the CPU 110 stores, when a capture gesture is performed, for example, the screen capture image that captures the current screen, an ID of the person who is currently being displayed in the address management app, and the name of the app as restoration information.

By storing such restoration information, the display contents of the screen at the time of the resume capture are thereafter able to be restored, based on the restoration information, in a state in which the same operation as the time of the resume capture is possible.

2-7. Other Embodiment 7

In addition, in the embodiment described above, when the document display screen 201 is resume captured, for example, the display range information (scrolling amount), the pass of the document file, the name of the app, and the screen capture image are stored as restoration information.

Without limiting thereto, various other pieces of information may be stored as restoration information, as long as the information is able to later restore the display contents of the screen at the time of the resume capture.

For example, the screen capture image is not necessarily stored as restoration information, and further, for example, the pass of the program of the app may be stored instead of the name of the app.

2-8. Other Embodiment 8

In addition, in the embodiment described above, when the capture icon Ci that is pasted to the home screen 200 is tapped, the display contents of the screen are restored based on restoration information that is made to correspond with the capture icon Ci.

Without limiting thereto, when the thumbnail capture image Sp that is pasted into the tray Tr is tapped, the display contents of the screen may be restored based on the restoration information that is made to correspond with the thumbnail capture image Sp.

In so doing, the effort of pasting the thumbnail capture image Cp to the home screen 200 is omitted, and the usability is improved.

Further, in the embodiment described above, when a capture gesture is performed, the tray Tr is drawn out over the screen and the screen capture image Cp is pasted into the tray Tr. Without limiting thereto, a region to which the screen capture image Cp is pasted may be set in advance on the screen.

That is, a region to which the screen capture image Cp is pasted may be set on the screen as the tray Tr when a capture gesture is performed, or may be typically provided on the screen regardless of whether or not a capture gesture has been performed.

2-9. Other Embodiment 9

In addition, in the embodiment described above, although a case in which a document display screen 201 that is horizontally long is displayed on a horizontal touch screen 102 has been described, without limiting thereto, a document display screen 201 that is vertically long may be displayed on a vertical touch screen 102.

In such a case, by which orientation the document display screen 201 is displayed may, for example, be suitably selected by the user.

Here, a resume capture is also able to be performed, in a case when a vertically long document display screen 201 is displayed on a vertical touch screen, by the same operation method as that in the embodiment described above.

Incidentally, when the document display screen 201 is displayed vertically in such a manner, the width is narrowed as compared to when displaying horizontally. Therefore, the condition of the length of the drag that is determined to be a capture gesture is shortened according to the width.

For example, the condition on the length of a drag is set to equal to or greater than 80% of the width of a vertical document display screen 201.

2-10. Other Embodiment 10

In addition, in the embodiment described above, the CPU 110 calculates the area of the contact portion based on the output of the touch panel 102B. Without limiting thereto, a function of calculating the area of the contact portion may be provided on the touch panel 102B, and the CPU 110 may obtain the value of the area from the touch panel 102B.

2-11. Other Embodiment 11

In addition, in the embodiment described above, the mobile terminal 100 including the electrostatic capacitance type touch panel 102B is applied to an embodiment of the disclosure.

Without limiting thereto, an apparatus including a pressure-sensitive type touch panel, a light sensor type touch screen in which light sensors are built into a liquid crystal panel, or various other operation devices may be applied, as long as they are operation devices that are able to detect a contact portion, to an embodiment of the disclosure.

Further, an apparatus including an organic EL (Electro Luminescence) panel or various other display devices or an apparatus that is connected to the various display devices may be applied, instead of the liquid crystal panel 102A, to an embodiment of the disclosure.

2-12. Other Embodiment 12

In addition, in the embodiment described above, the mobile terminal 100 as the information processing device is provided with the touch screen 102 as the operation unit and the display unit, the CPU 110 as the control unit, and the non-volatile memory 111 as the memory unit.

Without limiting thereto, each functional unit (operation unit, control unit, display unit, memory unit) of the mobile terminal 100 described above may be configured, as long as the same functions are included, by various other hardware or combinations of software and hardware.

2-13. Other Embodiment 13

In addition, in the embodiment described above, programs for executing various processing (including applications) are written into the non-volatile memory 111 of the mobile terminal 100.

Without limiting thereto, for example, slots for memory media such as memory cards may be provided in the mobile terminal 100, and the CPU 110 may read the programs from the memory media that are inserted in the slots to execute the programs.

Furthermore, the CPU 110 may install the programs read from the memory media in the non-volatile memory 111. Further, the CPU 110 may download the programs from an apparatus on a network through the network interface 113 and install the programs in the non-volatile memory 111.

2-14. Other Embodiment 14

In addition, an embodiment of the disclosure is not limited to the embodiment or the other embodiments described above. That is, the application scope of an embodiment of the disclosure encompasses a form that is an arbitrary combination of the embodiment and a portion or all of the other embodiments, or a form in which a portion is extracted.

The present application contains subject matter related to that disclosed in Japanese Priority Patent Application JP 2010-199347 filed in the Japan Patent Office on Sep. 6, 2010, the entire contents of which are hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An information processing device comprising:
an operation unit that receives an operation input, the operation input comprising a touch operation on an operating surface; and
a control unit that executes processing corresponding to the operation input when an area of contact on the operating surface during the touch operation is equal to or greater than a predetermined area, the processing comprising:
storing restoration information related to a display content that is being displayed at a point in time on a display screen of a display unit, the restoration information including a scrolling amount of a range of the display content that is being displayed at the point in time; and
restoring the display content based on the stored restoration information,
wherein if the control unit determines that a length of a drag of the touch operation is equal to or greater than a predetermined length and a direction of the drag of the touch operation is performed in a predetermined direction the control unit stores the restoration information in a memory unit,
wherein the restoration information includes information for restoring the display content at the point in time to a state in which a second operation input is possible, wherein the operation unit receives the second operation input, the second operation input comprising a second touch operation on the operating surface, and wherein the second operation input is a same type of operation as the first operation input.

2. The information processing device according to claim 1, wherein restoration information further includes a screen capture image obtained by capturing a screen that is being displayed on the display unit at the point in time.

3. The information processing device according to claim 2, wherein the control unit:

determines whether the touch operation was performed with one finger or two fingers; stores the screen capture image as the restoration information if the control unit determines that the touch operation was performed with one finger; and stores the screen capture image and operation information as the restoration information if the control unit determines that the touch operation was performed with two fingers, the operation information including information for restoring the display content such that a second operation input similar to the operation input can be performed to the restored display content.

4. An information processing device comprising:

an operation unit that receives an operation input, the operation input comprising a touch operation on an operating surface; and a control unit that executes processing corresponding to the operation input when an area of contact on the operating surface during the touch operation is equal to or greater than a predetermined area, the processing comprising:

storing restoration information related to a display content that is being displayed at a point in time on a display screen of a display unit; and restoring the display content based on the stored restoration information, wherein the restoration information includes information for restoring the display content at the point in time to a state in which a second operation input is possible, wherein the operation unit receives the second operation input, the second operation input comprising a second touch operation on the operating surface, wherein the second operation input is a same type of operation as the first operation input, and wherein in a case when the display content is a document display screen, the control unit obtains, as the restoration information, at least identification information of a document that is currently being displayed and display range information that indicates a range, out of a document, that is currently being displayed, to be stored as the restoration information.

5. The information processing device according to claim 4, wherein in a case when the display content is a movie reproduction screen or a music reproduction screen, the control unit obtains, as the restoration information, at least identification information of a movie or identification information of sounds that are being reproduced at the point in time and reproduction position information of a movie or reproduction position information of music that is being reproduced at the point in time, to be stored as the restoration information.

6. The information processing device according to claim 4, wherein in a case when the display content is a still image display screen, the control unit obtains, as the restoration information, at least identification information of a still image that is being displayed at the point in time and zoom information of a still image, to be stored as the restoration information.

7. The information processing device according to claim 4, wherein in a case when the display content is a web browser screen, the control unit obtains, as restoration information, at least an address of a webpage that is being displayed at the point in time and display range information that indicates a range, out of a webpage, that is being displayed at the point in time, to be stored as the restoration information.

8. An information processing device comprising: an operation unit that receives an operation input, the operation input comprising a touch operation on an operating surface; and a control unit that executes processing corresponding to the operation input when an area of contact on the operating surface during the touch operation is equal to or greater than a predetermined area, the processing comprising:

storing restoration information related to a display content that is being displayed at a point in time on a display screen of a display unit; and restoring the display content based on the stored restoration information, wherein the restoration information includes information for restoring the display content at the point in time to a state in which a second operation input is possible, wherein the operation unit receives the second operation input, the second operation input comprising a second touch operation on the operating surface, wherein the second operation input is a same type of operation as the first operation input, and wherein the control unit causes a screen capture image obtained by capturing a screen that is being displayed at the point in time to be displayed on a screen when the area of contact on the operating surface during the touch operation is equal to or greater than the predetermined area, and once a predetermined amount of time has passed, causes a thumbnail capture image obtained by making a thumbnail of the screen capture image to be pasted to a tray displayed on the screen, and a capture icon obtained by making the thumbnail capture image an icon is caused to be pasted, according to a third operation input performed via the operation unit, to a predetermined screen and the restoration information is caused to correspond with the capture icon and be stored in a memory unit.

9. The information processing device according to claim 8, wherein the control unit reads, when the capture icon is selected by an operation input performed via the operation unit, the restoration information made to correspond with the capture icon from the memory unit, and restores display contents of a screen based on the restoration information.

* * * * *